3,138,500
MONOPROPELLANT COMPRISING SULFURIC ACID NITROSYLPYROSULFATE AND A FUEL STABLE TO SULFURIC ACID

David M. Gardner, North Wales, Pa., assignor to Pennsalt Chemicals Corporation, Philadelphia, Pa., a corporation of Pennsylvania
No Drawing. Filed June 13, 1960, Ser. No. 36,085
13 Claims. (Cl. 149—74)

This invention relates to monopropellant rocket fuels which are improved monopropellants for auxiliary power generation. In particular this invention deals with novel monopropellants comprising a fuel, an oxidizer, and an additive to improve stability and performance.

In rockets and missiles which contain control and navigation equipment, auxiliary power units are often used to provide the energy necessary to activate the various mechanisms. Frequently, these auxiliary power units are also rocket engines which use their exhaust gases to drive electric generators. Because of the special conditions under which some auxiliary rocket engine power units must function, the monopropellants which they employ must meet very unusual specifications. For example, the monopropellants used in such rocket engines must be thermally stable, capable of withstanding elevated temperatures for extended periods of time prior to satisfactory ignition and performance. In addition, the monopropellant must have a suitably high specific impulse at the chamber pressure during use. Still other requirements for the monopropellants are their ready ignition, low sensitivity to explosion, non-corrosive properties to the metals used in the engine, and they should form no solid exhaust products which build up on the generator vanes causing imbalance.

Monopropellants consist basically of two parts; viz, a fuel and an oxidizer. The monopropellant may be a pure compound combining both of these essential parts in a single moiety. Alternately, the monopropellant may be a binary system composed of the two ingredients. In the binary systems, various types of fuels have been employed depending upon a particular need or function. Likewise numerous oxidizers have been employed and certain combinations are particularly useful. Sulfuric acid (100%) is a stable oxidizer at temperatures up to 640° F., but it does not possess sufficient energy to yield attractive monopropellants when formulated with a mutually soluble fuel as, for example, an alkane or fluoroalkane sulfonic acid.

Now, according to this invention, it has been found that an improved monopropellant is obtained when nitrosyl pyrosulfate ($(NO)_2S_2O_7$) is added to propellant systems based on a sulfuric acid oxidizer. Unexpectedly, the nitrosyl pyrosulfate imparts higher oxidizing potential to the sulfuric acid, improves thermal stability of the system and makes possible a readily ignited, safe monopropellant meeting the requirements for use in auxiliary power units.

The techniques by which the monopropellants of this invention are used in auxiliary engines are well known in the art. The liquid monopropellant is held in a storage tank until ready for use. When electrical energy is to be generated from the monopropellant, a valve assembly is automatically opened and the monopropellant is passed through an injector face and sprayed into the rocket motor chamber. The propelling means to carry the propellant into the rocket chamber is preferably gas pressure (e.g., an inert gas such as nitrogen, argon, etc.) under which pressure the monopropellant is held in the storage tank. Less preferably, because of its undesired weight, an electrical pumping system may be used. Ignition of the propellant is readily accomplished with an electric glow plug within the rocket chamber and after the initial ignition, the burning of the monopropellant is self sustaining. As the gaseous products from the combustion exit from the rocket chamber they turn turbine blades of an electrical generator which delivers the desired electrical energy.

In a preferred embodiment of this invention the monopropellant is prepared by the addition of a standard solution of nitrosyl pyrosulfate in sulfuric acid to the fuel. The standard solution is prepared by dissolving nitrosyl pyrosulfate in sulfuric acid. Preferably, the amount of nitrosyl pyrosulfate used will be sufficient to produce a saturated solution (65% by weight of nitrosyl pyrosulfate). This solution has a readily calculated oxidizing capacity and thus provides a standard with which to work. A solution of nitrosyl pyrosulfate in sulfuric acid containing less than about 63% to 65% of $(NO)_2S_2O_7$ will adversely affect performance of the monopropellant, but may be used if optimum performance is not critical. Depending upon the kind and amount of fuel used, an amount of standard oxidizer solution is added to provide a stoichiometric amount of oxygen to completely burn the sulfur, nitrogen, carbon and hydrogen components of the fuel. The resulting monopropellant is handled and used in the conventional manner without danger of explosion.

In preparing monopropellants in accord with this invention, it is also possible to use additives for various specific purposes. For example, nitric acid may be added to improve the ignition properties of the monopropellant composition. Up to about 35% by weight of the propellant of such additives may be used, but they should be kept to a minimum since they tend to reduce thermal stability of the monopropellant.

The fuel which will be employed to prepare the improved monopropellant will preferably be selected from the class of alkanesulfonic acids, fluoroalkanesulfonic acids, tetraalkylammonium alkyl sulfates, and tetraalkylammonium sulfonates of alkane and fluoroalkane sulfonic acids. Examples of such fuels include methanesulfonic acid, ethanesulfonic acid, n-butanesulfonic acid, trifluoroethanesulfonic acid, tetramethylammoniumethyl sulfate $((CH_3)_4\text{—}N^+\text{ }^-O\text{—}SO_2O\text{—}C_2H_5)$, tetramethylammonium methylsulfonate $((CH_3)_4\text{—}N^+\text{ }^-O_3S\text{—}CH_3)$, tetramethylammonium trifluoro methylsulfonate, and the like. Of this class the preferred fuels are those containing up to about 5 carbon atoms in the alkyl radicals and particularly preferred are the alkane and fluoroalkanesulfonic acids, more specifically methanesulfonic acid, ethanesulfonic acid, and 1,1,1-trifluoroethanesulfonic acid. It will be understood that other high energy fuels stable to the sulfuric acid oxidizer system may also be used to make monopropellants which are improved with nitrosyl pyrosulfate.

Nitrosyl pyrosulfate and its preparation from $SO_3$ and $N_2O_4$ is described by Mellor in volume VIII, page 541 of his work on Inorganic Chemistry. This compound is also obtained by reacting $SO_2$ and $NO_2$ in an autoclave and initiating the reaction by slight heating above room temperature. The product is a white solid which is simply crushed and powdered for storage and use. It is stored under anhydrous conditions, as for example in containers containing a desiccant such as activated silica gel or sulfuric acid.

EXAMPLE 1

[ALL PARTS BY WEIGHT]

A standard oxidizer solution was prepared by adding nitrosyl pyrosulfate to sulfuric acid until a saturated solution was formed. The resulting solution was a clear, yellow viscous liquid.

A monopropellant composition was prepared by adding 43.2 parts of the standard oxidizer to a mixture of 24.08 parts of ethanesulfonic acid and 33.62 parts of nitric acid. This propellant was a clear, light yellow, slightly viscous liquid and consisted on a weight basis of about 24% fuel, 17% sulfuric acid, 25 nitrosyl pyrosulfate, and 34% nitric acid. It was subjected to evaluation as follows:

Corrosion

Weighed samples of stainless steel and aluminum were placed in contact with the liquid propellant at 25° C. for five days. No attack was visible to the eye and no weight change was observed.

Stability

The liquid propellant was heated at 450° F. for eight hours. The solution showed only about 11% decomposition as determined by the weight of gas evolved. Thus, this propellant may be used up to temperatures of about 450° to 475° F. without serious loss. Previously known monopropellants (e.g., dimethyltriethylenediammonium dinitrate dissolved in nitric acid) have a maximum permissible exposure below 249° F. and are thus limited to use at lower temperatures.

Ignition

When the propellant was dropped in air on a metal plate heated to 1100° F. it ignited readily. (At temperatures above about 900° F. most previously known monopropellants decompose and thus cannot be used at higher temperatures.)

Shock Sensitivity

When struck by a two-kilogram weight dropped from a height of twelve feet, the propellant did not explode. This represents an impact energy of about 700 kgm. cm. Monopropellants having an impact energy above 120 kgm. cm. are arbitrarily considered safe to handle.

Performance

The propellant was fired by feeding it at 77° F. to a chamber pre-heated to 2100° F. by the decomposition of hydrazine. Transition to the sustained combustion of the monopropellant occurred smoothly. No solid products were formed during combustion. The data follow:

Thrust level _____ pounds__ 20
Nozzle diameter _____ 0.080"
Pressure ratio _____ 26:1
Measured impulse _____ seconds__ 122
Flame temperature _____ ° F__ 1275
Characteristic velocity _____ ft./sec__ 3500

It is evident from the above data that the monopropellant has excellent properties and gives very satisfactory performance.

EXAMPLE 2

Use of Trifluoroethanesulfonic Acid as Fuel

A. PREPARATION OF $CF_3CH_2SO_3H$

Chlorine as was passed through a stirred mixture of 30 g. of bis(trifluoroethyl) disulfide (U.S. Patent 2,894,991) in 75 ml. of water at 60°–70° C. for two hours, after which time chlorine was no longer absorbed. After standing, the layer heavier than water was separated and dried over anhydrous magnesium sulfate. Vacuum distillation gave 32.5 g. (70% yield) of the colorless liquid, trifluoroethanesulfonyl chloride, B.P. 65° C. (45 mm.); $n_D{}^{23}$ 1.3873.

*Analysis.*—Calcd. for $C_2H_2ClF_3O_2S$: C, 13.16; H, 1.11; Cl, 19.40; S, 17.57. Found: C, 13.40; H, 1.12; Cl, 20.02; S. 17.27.

Hydrolysis of 20 g. of trifluoroethanesulfonyl chloride by refluxing with 50 ml. of water for three hours gave a quantitative yield (18 g.) of trifluoroethanesulfonic acid after removal of the water under vacuum. Vacuum distillation of the acid gave the colorless, hygroscopic solid ($CF_3CH_2SO_3H$); B.P. 100° C. (0.5 mm.); M.P. 50–52° C.

B. USE OF $CF_3CH_2SO_3H$ IN MONOPROPELLANT

As in Example 1 a monopropellant composition was prepared by mixing stoichiometric quantities of the standard oxidizer solution and trifluoroethanesulfonic acid. The clear, somewhat viscous, light yellow monopropellant was then tested for thermal stability and showed only 5.6% weight loss after heating for eight hours at 480° F. Thus, this monopropellant system can be used at temperatures up to about 500° F. without serious decomposition.

Performance tests on this monopropellant indicate results similar to those obtained by the monopropellant of Example 1.

EXAMPLE 3

Monopropellants were prepared by mixing stoichiometric amounts of the standard oxidizing solution and various fuels. The following Table I shows the fuels used and the thermal stability of the monopropellants prepared:

*Table I*

| Monopropellant | Temp. (° F.) | Time (Hrs.) | Percent Weight Loss |
|---|---|---|---|
| Standard oxidizer plus: | | | |
| (a) $CH_3SO_3H$ | 570 | 8 | 18.8 |
| (b) [1] $CH_3SO_3{}^-\ {}^+N(CH_3)_4$ | 570 | 8 | 24.0 |
| (c) [1] $[(CH_3)_4\text{—N}]_2{}^{++}SO_4{}^=$ | 570 | 24 | 14.0 |
| (d) [1] $(CH_3)_4\text{—}N^+\ {}^-O_3\text{—}S\text{—}CF_3$ | 570 | 8 | 9.3 |

[1] Prepared from the free acid by reaction with tetramethylammonium hydroxide and evaporation to dryness.

It is evident from the above description and examples that the novel monopropellants of this invention show good performance, have improved thermal stability and other desirable properties and represent a significant advance in the art.

It will be understood that many variations may be made in the practice of this invention and it is thus not to be limited by the specific examples or description set forth above.

I claim:

1. A monopropellant composition consisting essentially of sulfuric acid, nitrosyl pyrosulfate, and a fuel stable to sulfuric acid selected from the class of alkanesulfonic acids, fluoroalkanesulfonic acids, tetraalkylammoniumalkyl sulfates, tetraalkylammoniumalkyl sulfonates, and tetraalkylammoniumfluoroalkyl sulfonates.

2. A monopropellant composition consisting essentially of sulfuric acid, nitrosyl pyrosulfate and a fuel selected from the class of alkanesulfonic acids, fluoroalkanesulfonic acids, tetraalkylammoniumalkyl sulfates, tetraalkylammoniumalkyl sulfonates, and tetraalkylammonium fluoroalkyl sulfonates, said fuel containing from 1 to about 5 carbon atoms in each alkyl radical, and said sulfuric acid and nitrosyl pyrosulfate being present in an amount sufficient to provide a stoichiometric amount of oxygen to completely burn said fuel.

3. A monopropellant composition as in claim 2 consisting essentially of sulfuric acid, nitrosyl pyrosulfate and an alkanesulfonic acid.

4. A monopropellant composition as in claim 2 consisting essentially of sulfuric acid, nitrosyl pyrosulfate and methanesulfonic acid.

5. A monopropellant composition as in claim 2 consisting essentially of sulfuric acid, nitrosyl pyrosulfate and ethanesulfonic acid.

6. A monopropellant composition as in claim 2 consisting essentially of sulfuric acid, nitrosyl pyrosulfate and a fluoroalkanesulfonic acid.

7. A monopropellant composition as in claim 2 consisting essentially of sulfuric acid, nitrosyl pyrosulfate and 1,1,1-trifluoroethanesulfonic acid.

8. A monopropellant composition as in claim 2 consisting essentially of sulfuric acid, nitrosyl pyrosulfate and a tetraalkylammonium salt of a radical taken from the group of alkyl sulfates, alkane sulfonates, and fluoroalkane sulfonates.

9. The monopropellant of claim 8 wherein the salt is tetramethylammonium sulfate.

10. The monopropellant of claim 8 wherein the salt is the tetramethylammonium salt of methanesulfonic acid.

11. The monopropellant of claim 8 wherein the salt is the tetramethylammonium salt of trifluoromethanesulfonic acid.

12. The monopropellant composition of claim 2 containing nitric acid as an ignition improver.

13. A monopropellant composition which comprises on a percent by weight basis about 17% sulfuric acid, about 24% ethanesulfonic acid, about 25% nitrosyl pyrosulfate and about 34% nitric acid.

References Cited in the file of this patent

Mellor: Comprehensive Treatise on Inorganic and Theoretical Chemistry, volume 8, page 703, lines 23 to 26.